UNITED STATES PATENT OFFICE.

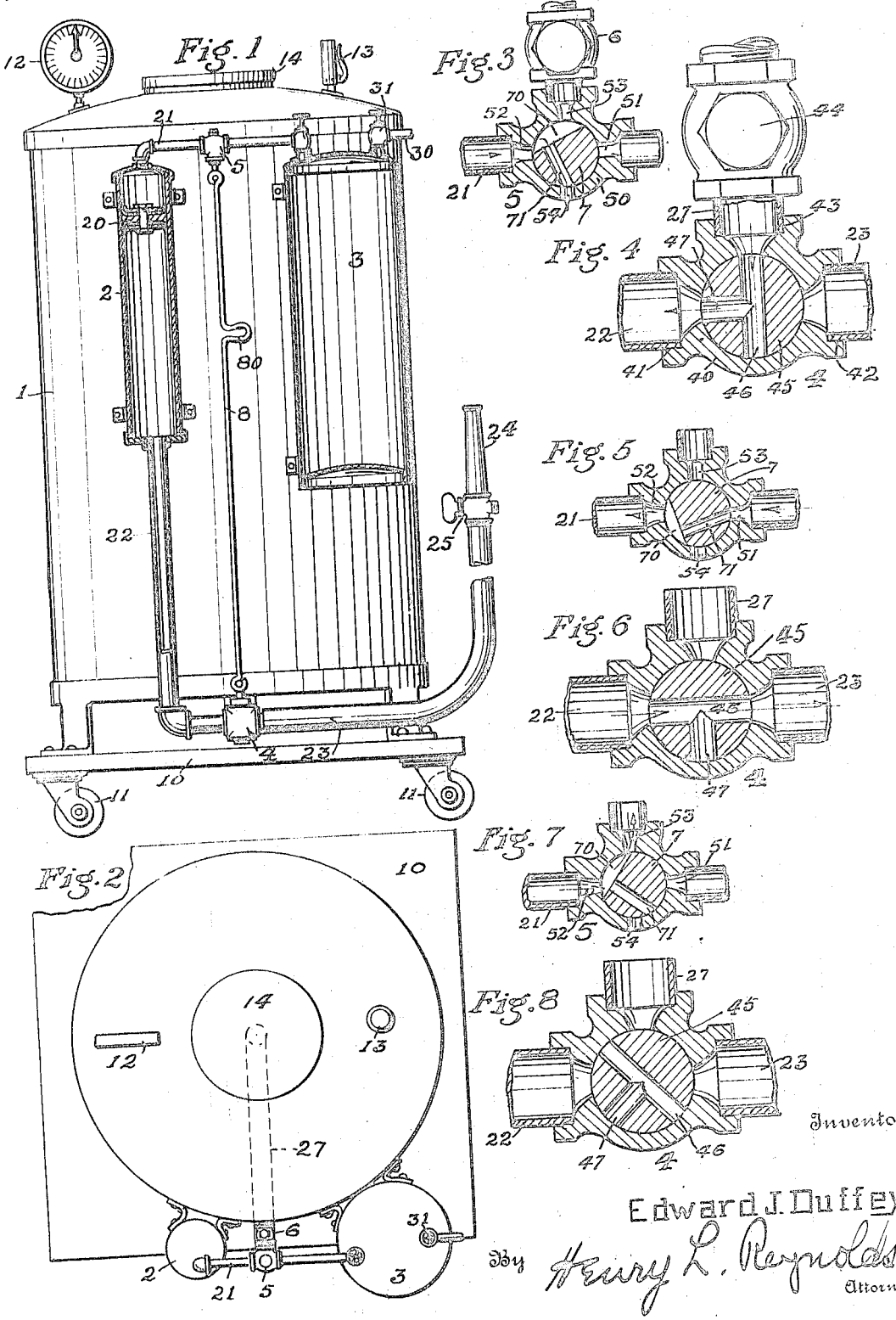

EDWARD J. DUFFEY, OF SEATTLE, WASHINGTON.

GREASE-GUN.

1,295,451.  Specification of Letters Patent.  Patented Feb. 25, 1919.

Application filed September 25, 1918. Serial No. 255,570.

*To all whom it may concern:*

Be it known that I, EDWARD J. DUFFEY, a citizen of the United States, and resident of the city of Seattle, county of King, State of Washington, have invented certain new and useful Improvements in Grease-Guns, of which the following is a specification.

My invention consists of an apparatus which is designed for dispensing grease or other viscous products in measured quantities. Such a device has been employed for supplying grease to the differential casings of automobiles and my invention, as herein illustrated, has been designed for this special purpose. Such an apparatus is usually referred to as a grease gun.

My invention will be herein described as designed for and applied to such use. It will, however, be understood that it is capable of being applied to other analogous uses.

The object of my invention is to provide a device of this character which shall be more efficient and convenient in its operation whereby the labor and time required for performing an operation of this sort may be very materially reduced.

The particular features of my invention, which I consider to be novel and upon which I desire patent, will be set forth in the specification following and then particularly defined in the claims thereof.

The device as illustrated in the accompanying drawings show my invention embodied in the type of construction which is at this time most preferred by me.

Figure 1 is a side elevation of the device showing, however, the air storage tank and the grease gun with its cylinder, in longitudinal section.

Fig. 2 is a top or plan view of the device.

Figs. 3 and 4 are sectional views respectively of the air control and grease control valve in one position.

Figs. 5 and 6 are views of the same parts showing them in a different position, and Figs. 7 and 8 are views of the same parts showing them in a third position.

The differential mechanisms of automobiles are inclosed within a casing and this casing is supplied with a quantity of grease in which the gearing of said differential operates. My device is designed for the convenient supplying of casings of this kind within which gears or other mechanisms are operated, with the grease which is required in order to prevent wear. I have herein described this device as applied to the injection of grease in differential casings of automobiles, it being understood that the device may be used for similar work with other mechanisms.

A tank 1, which is inclosed so that it may be operated under an internal pressure, is provided for the reception of a quantity of grease. This constitutes a storage tank for the grease and it may be substantially filled with grease at the beginning of its operation.

Associated with this is a cylinder 2 provided with a piston 20, these constituting what is ordinarily referred to as a grease gun, this term as herein used meaning a device which may be operated to forcibly inject grease into any mechanism desired. With these parts is also associated some source of air under pressure, which pressure should be higher than that which is used within the grease tank 1.

In order to make my device readily portable so it may be used wherever desired and moved about from place to place, I provide an air storage tank 3, which, along with the grease gun 2, is shown as secured to the exterior of the grease tank 1. The air storage tank 3 may be charged from any convenient and suitable source, such as the air under pressure which is usually to be found about public garages. This may be charged through such a source.

If the grease gun device is to be employed only in one location, the storage tank 3 may be dispensed with and a pipe connecting directly with the ordinary storage tank of a compressed air system, such as is used about garages, may be employed.

The tank 1 is an ordinary tank which need not have any special features other than those shown. It is mounted upon a floor or platform 10, which is in turn mounted upon casters or wheels 11, for convenience in moving it from place to place. This tank may be provided with a pressure gage 12 and also with a relief or pop valve 13, the latter being set to blow off air as soon as the maximum desired pressure is reached.

A suitable pressure for use in this tank would be ten pounds, or some pressure near that. The pressure employed, however, may vary in accordance with the desires of the operator. This tank is also provided with an opening normally tightly closed by a cap, as 14, through which the tank may be conveniently filled with grease.

The grease gun 2 has an air pipe connection 21 to one end thereof and a grease pipe connection 22 to the opposite end. The pipe 22 has a lateral branch 27 connecting with the bottom of the grease tank. It also has a pipe or hose 23 which terminates in a nozzle 24 of such character that the nozzle may be screwed into or otherwise secured to the filling-opening of the differential casing. The nozzle 24 preferably should have a valve, as 25, connected therewith so as to be able to control the discharge of grease.

A valve 4 is positioned at the point of joining of the pipes 22, 23, and the pipe 27 which connects these with the bottom of the grease tank. This valve is shown in Figs. 4, 6 and 8, in different positions. Its particular construction and operation will be described more in detail later.

The pipe 21 which connects with the opposite end of the grease gun cylinder is connected with the upper end of the air storage tank 3, that is, it is connected with a source of air under pressure. In this pipe is inserted a valve 5 which is shown in Figs. 3, 5 and 7, in different positions. This valve is connected through a check valve 6 with the upper part of the grease storage tank. The check valve is so placed as to permit discharge of air from the pipe 21 into the tank and to prevent flow of air from the tank outward. The air storage tank 3 is provided with a pipe 30 and a valve 31 controlling the same, through which it is charged under pressure from any convenient and suitable source.

The casing 50 of the valve 5 is provided with four openings 51, 52, 53, 54, at opposite sides thereof, two of these being connected respectively with the grease gun 2 and with the air storage tank 3. Another one of these 53, which is located at substantially 90° from the two first mentioned, is connected with the check valve 6 and through this with the upper part of the grease tank. The fourth, 54, which is opposite the one which connects with the tank, opens freely to the atmosphere and constitutes an exhaust opening. The rotative member or valve proper, 7, is provided with a cut away portion 70 at one side thereof and with a hole 71 passing through the body thereof from the groove 70, so positioned as to distribute the air in the manner which will be described.

The valve 4 has its casing 40 provided with three openings, 41, 42 and 43. The openings 41 and 42 are connected respectively with the pipe 22 and the hose 23, while the opening 43 is connected, through a check valve 44, with the bottom of the grease tank.

The two valves 4 and 5 are connected to be operated together in any suitable manner. The means herein shown consists of a rod 8, which at opposite ends is connected with the said valves and which is provided with a handle 80 by which it may be turned.

In the position of the two valves, as shown respectively in Figs. 3 and 4, which are the positions occupied by the valves when the device is not in use, the lower end of the grease tank is connected, through the passages in the rotative valve plug 45, with the lower end of the grease gun. The passages in the valve plug 45 consist of a central through channel 46 and a lateral channel 47, extending from this central channel to one side and positioned at right angles to the channel 46.

The valve plug 7 of the valve 5, provides a free communication from the upper end of the grease gun to the outer air through the port 54 in the valve casing. It also provides free communication from the upper end of the grease gun through the channel 70 in the plug, and port 53 in the casing, with the upper end of the grease storage tank. As, however, the check valve intervenes between this valve 5 and the grease tank, the air in the grease tank cannot escape at this point.

By reason of the free communication with the lower end of the grease tank and the further fact that air under pressure is contained in the upper part of this grease tank, the grease will be caused to flow through the valve 4 and pipe 22 so as to fill the grease gun. This will cause the piston 20 therein to rise to the upper limit of its stroke.

When it is desired to discharge a quantity of grease the nozzle 24 is connected up with the casing. The valves 4 and 5 are operated through the rod 8 to give them a quarter turn, thus causing them to assume the positions shown respectively in Figs. 5 and 6. In this position the port 53 in the valve 5 is closed, thus breaking all communication of these parts with the upper end of the grease tank. The valve plug 54 is turned so as to make a through connection between the grease discharge pipe 22 and the hose 23, and through this to the discharge nozzle 24. In consequence, air under pressure from the tank 3, or such other source of supply as may be used, is admitted to the upper end of the grease gun. This forces the grease out through the nozzle 24.

The discharge of the contents of the grease gun takes but a very short time. If more than is contained in one filling of the grease gun be desired, the valve is turned part of the way back. The turning of the valve, which is required for discharging the grease, is in the construction shown at 90°. The return of the valve is first through a smaller angle, as half of this amount. This position of the two valves is shown in Figs. 7 and 8.

In this position the plug 7 of valve 5 is turned so as to provide free communication between the pipe 21, leading from the upper end of the grease gun, to the upper end of the grease tank. As the pressure used for the expulsion of the grease from the grease gun is considerably higher than that which is normally carried in the grease tank, a portion of this air will be exhausted into the grease tank. As the grease tank is provided with a blow off or pop valve 13, if this tends to increase the pressure above the limit for which it has been set, this valve will relieve the pressure to whatever extent is necessary.

The valves 4 and 5 are then turned into the position shown in Figs. 3 and 4, wherein free communication is provided through ports 71 and 54 from the grease gun to the outside air, thus entirely exhausting the air from the grease gun. The pressure in the grease tank will then promptly fill the grease gun and it is ready for re-use.

By the expedient of employing the exhaust from the grease gun to secure and maintain the air pressure required in the grease tank, the consumption of air under pressure is reduced. The air provided to secure pressure in the grease tank is air which has been used for operating other devices and which would otherwise be exhausted to the atmosphere and be wasted. This is employed by me to secure and maintain the needed pressure in the grease tank.

By this expedient it is possible to fill the grease tank substantially full, as an air storage capacity of any material volume is not needed in this tank, in order to suitably discharge the grease therefrom as desired. Also, the pressure in this tank is maintained constant until it is fully discharged. My construction as herein shown therefore saves a considerable quantity of compressed air.

I have secured far better results in the operation of a device of this sort where the pressure in the grease tank is kept at a comparatively low pressure and wherein the pressure applied to the grease gun is far higher than that employed in the grease tank. I have found that where a pressure is employed in the grease tank which is sufficient to satisfactorily force the grease through the hose and into the differential, there is a great tendency for this pressure to blow out through the grease, permitting the air to enter the pipes connecting it with the grease gun. This is due to the fact that the very high pressure causes too rapid a flow of the grease to the gun.

By keeping the pressure in the grease tank at a moderate level the flow of grease is reduced in speed. At the same time the speed of flow is ample to fill the grease gun without causing any material loss of time. It does at the same time prevent blowing out of the air pressure. This result is due in a large measure to the viscous character of the grease employed, which causes it to hang, to a certain extent, to the side of the tank unless it be given time to settle.

It is believed that the operation of this device has been made clear by the previous description and further amplification thereof is not required.

What I claim as my invention is:

1. A device for dispensing grease, comprising a grease storing tank adapted to be maintained under pressure, an air tank adapted to hold air under a superior pressure, a grease gun, a filling pipe connecting one end of the grease gun with the grease tank, a discharge nozzle connected with the same end of the grease gun, a pipe connecting the other end of the grease gun with the air tank, and means for controlling the air connections with the grease gun.

2. A device for dispensing grease comprising a grease storing tank adapted to be maintained under pressure, a source of supply of air under a superior pressure, a grease gun, grease supply and discharge connections with one end of the grease gun, air supply connections from the other end of the grease gun to the said source of air supply under pressure and means for controlling the application of air to the grease gun and the discharge of grease from said gun.

3. A device for dispensing grease comprising a grease storing tank adapted to be maintained under pressure, a source of supply of air under pressure, a grease gun, grease supply connections from said tank to one end of the grease gun, a discharge pipe connected with the same end of the grease gun, an air supply connection from the other end of the grease gun to the said source of supply of air under pressure, air discharge connection from the grease gun to the grease storage tank, and valve means for controlling the flow of air through said connections.

4. A device for dispensing grease comprising a grease storing tank adapted to be maintained under pressure, a source of supply of air under pressure, a grease gun, grease supply connections from said tank to one end of the grease gun, a discharge pipe connected with the same end of the grease gun, an air supply connection from the other end of the grease gun to the said source of supply of air under pressure, an air discharge connection from the grease gun to the grease storage tank, an air relief valve upon the grease tank, and valve means for controlling the flow of air through said connections.

5. A device for dispensing grease comprising a grease storing tank adapted to be maintained under pressure, a source of supply of air under pressure, a grease gun, grease supply connections from said tank to one end of the grease gun, a discharge pipe connected with the same end of the grease gun, an air supply connection from the other end of the grease gun to the said source of supply of air under pressure, an air discharge connection from the grease gun to the grease storage tank, a three-way valve controlling the flow in the grease connections and a four-way valve in the air connections adapted in one position to exhaust the air from the grease gun to the grease storage tank and in another position to discharge the air to the outside.

6. A device for dispensing grease comprising a grease storing tank adapted to be maintained under pressure, a grease gun, an air storage tank containing air under a pressure superior to that in the grease tank, pipes connecting said air tank with one end of the grease gun and also having a connection with the grease storage tank, a four-way valve in said pipe adapted in one position to charge the grease gun from the air tank, in another position to exhaust the air from the grease gun into the grease tank and in another position to exhaust the air from the grease gun to the exterior air, and means operated in conformity with the said air valve to supply the oil from its storage tank to the grease gun and for discharging the grease from the gun to another point.

Signed at Seattle, Washington, this 14th day of September, 1918.

EDWARD J. DUFFEY.